United States Patent
Hobson et al.

(10) Patent No.: US 9,210,242 B2
(45) Date of Patent: Dec. 8, 2015

(54) DEVICE HOUSINGS WITH HIDDEN FASTENERS

(75) Inventors: Phillip M. Hobson, Menlo Park, CA (US); Fletcher R. Rothkopf, Los Altos, CA (US); Anna-Katrina Shedletsky, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 563 days.

(21) Appl. No.: 13/602,068

(22) Filed: Aug. 31, 2012

(65) Prior Publication Data

US 2014/0063716 A1 Mar. 6, 2014

(51) Int. Cl.
H05K 5/00 (2006.01)
H04M 1/02 (2006.01)
G06F 1/16 (2006.01)

(52) U.S. Cl.
CPC ........... *H04M 1/0249* (2013.01); *G06F 1/1656* (2013.01); *H04M 1/0252* (2013.01)

(58) Field of Classification Search
CPC .................. H05K 2201/10159; H05K 5/0243
USPC ............ 361/679.01, 679.02, 679.08, 679.09, 361/679.3, 679.55–679.59; 345/156, 157, 345/168, 169, 184; 369/282, 291, 253, 369/44.16, 75.5
See application file for complete search history.

(56) References Cited

U.S. PATENT DOCUMENTS

| | | | |
|---|---|---|---|
| 6,301,100 B1 | 10/2001 | Iwata | |
| 6,480,398 B1 | 11/2002 | Fiora et al. | |
| 7,665,813 B2 | 2/2010 | Wang | |
| 7,704,085 B1 | 4/2010 | Chang | |
| 8,665,160 B2 * | 3/2014 | Uttermann et al. | ........... 343/702 |
| 2005/0107137 A1 | 5/2005 | Byun et al. | |
| 2009/0257207 A1 | 10/2009 | Wang et al. | |
| 2010/0053853 A1 | 3/2010 | Allore et al. | |
| 2010/0096963 A1 | 4/2010 | McLaughlin et al. | |
| 2010/0271762 A1 | 10/2010 | Chiang et al. | |
| 2010/0330400 A1 * | 12/2010 | Hu et al. | .......... 429/50 |
| 2011/0216484 A1 | 9/2011 | Wu et al. | |
| 2012/0003867 A1 | 1/2012 | Nihei et al. | |
| 2012/0034955 A1 * | 2/2012 | Ahn | .............. 455/566 |
| 2012/0162872 A1 | 6/2012 | Liang | |

FOREIGN PATENT DOCUMENTS

JP 2005-147401 6/2005

OTHER PUBLICATIONS

PCT Application No. PCT/US2013/051743—International Search Report and Written Opinion dated Nov. 12, 2013.

* cited by examiner

Primary Examiner — Jerry Wu
(74) Attorney, Agent, or Firm — Downey Brand LLP

(57) ABSTRACT

A housing for a personal electronic device includes a first housing portion, a second housing portion, and a pivoting member pivotally attached to the second housing portion. The first housing portion defines a first plane and has a first support member arranged thereon at a first angle to the first plane. The first support member includes at least one through hole for engaging a fastener. The second housing portion defines a second plane and has a second support member arranged thereon at a second angle to the second plane. The second support member includes at least one retaining hole configured to align with the at least one through hole and retain the fastener. The pivoting member is configured to pivot between at least two positions to obscure the fastener.

22 Claims, 10 Drawing Sheets

DEVICE HOUSINGS WITH HIDDEN FASTENERS

FIELD OF THE DESCRIBED EMBODIMENTS

The described embodiments relate generally to personal electronic devices, and more particularly, to housings of personal electronic devices with hidden fasteners and methods of assembling the same.

BACKGROUND

Conventionally, personal electronic devices include housings and a plurality of electronic components disposed thereon and therein. Screw or screw-like fasteners offer a relatively strong and durable form of fastening one or more portions of the housings together, as well as fastening the electronic components therein and thereon.

However, if considering the overall cosmetic appearance of personal electronic devices, sleeker and streamlined housings may be more appealing under a plurality of circumstances. Conventional approaches to offering sleeker and more streamlined housings may include countersunk screw holes, cosmetic labeling or obscuring films to hide fasteners, glue or adhesive and snap-together construction techniques, or combinations of a variety of approaches.

Generally, snap-together construction techniques may result in a less durable housing subject to damage if dropped. Furthermore, cosmetic labeling and opaque films may wear down, peel off, or otherwise impinge cosmetic quality and appearance. Moreover, repair or rework of faulty or damaged devices utilizing these techniques may introduce more damage or cosmetic blemishes, for example by leaving unsightly labeling residue, adhesive residue, or breaking of tabs/slots used in snap-together construction.

Therefore, what is needed are improvements in device housings that overcome these and other drawbacks.

SUMMARY OF THE DESCRIBED EMBODIMENTS

This paper describes various embodiments that relate to personal electronic devices, housings associated therewith, and methods of assembling the same.

According to one embodiment of the invention, a housing for a personal electronic device includes a first housing portion, a second housing portion, and a pivoting member pivotally attached to the second housing portion. The first housing portion defines a first plane and has a first support member arranged thereon at a first angle to the first plane. The first support member includes at least one through hole for engaging a fastener. The second housing portion defines a second plane and has a second support member arranged thereon at a second angle to the second plane. The second support member includes at least one retaining hole configured to align with the at least one through hole and retain the fastener. The pivoting member is configured to pivot between at least two positions, a first position of the at least two positions obscures and hides the fastener, at least one through hole, and the at least one retaining hole, and a second position of the at least two positions allows access to the fastener, at least one through hole, and the at least one retaining hole.

According to another embodiment of the invention, a housing for a personal electronic device includes a first housing portion, a second housing portion arranged to receive the first housing portion, and a pivoting member pivotally attached to the second housing portion. The first housing portion includes a first support member arranged thereon. The first support member includes at least one through hole for engaging a fastener. The second housing portion defines an inner cavity and has a second support member arranged in the inner cavity. The second support member includes at least one retaining hole configured to align with the at least one through hole and retain the fastener. The pivoting member is configured to pivot between at least two positions. A first position of the at least two positions obscures and hides the fastener, at least one through hole, and the at least one retaining hole, and a second position of the at least two positions allows access to the inner cavity.

According to another embodiment of the invention, a method of assembling a housing of a personal electronic device is disclosed. The housing includes a first housing portion having a first support member arranged thereon with at least one through hole for engaging a fastener, a second housing portion defining an inner cavity and with a second support member arranged in the inner cavity having at least one retaining hole configured to align with the at least one through hole and for retaining the fastener, and a pivoting member pivotally attached to the second housing portion configured to pivot between at least two positions. A first position of the at least two positions obscuring and hiding the fastener, at least one through hole, and the at least one retaining hole, and a second position of the at least two positions allowing access to the inner cavity. According to the embodiment, the method includes populating the inner cavity of the housing with a plurality of electronic components, electrically interconnecting a component supported by the pivoting member to at least a portion of the populated electronic components, aligning and engaging the first housing portion to the second housing portion to align the first and second support members, pivoting the pivoting member to the second position to allow access to the aligned support members, attaching the first housing portion to the second housing portion through the accessible aligned support members, and pivoting the pivoting member to obscure the attached aligned support members.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Device housings and methods of assembling personal electronic devices provide manners to hide or obscure structural fasteners of an assembled device. The housing includes at least two main portions with complementary support members for engaging and retaining structural fasteners arranged thereon or therein. The support members are separated from an edge of the assembled device such that a pivoting member attached to one of the main portions allows for access to the structural fasteners but hides and obscures the same. The pivoting member may also be obscured with a disposable cosmetic cap arranged to snap or otherwise attach over the pivoting member onto one of the main housing portions. The pivoting member may support an antenna or other communications component that may benefit from substantial radio transparency of the disposable cosmetic cap.

Figure 1:
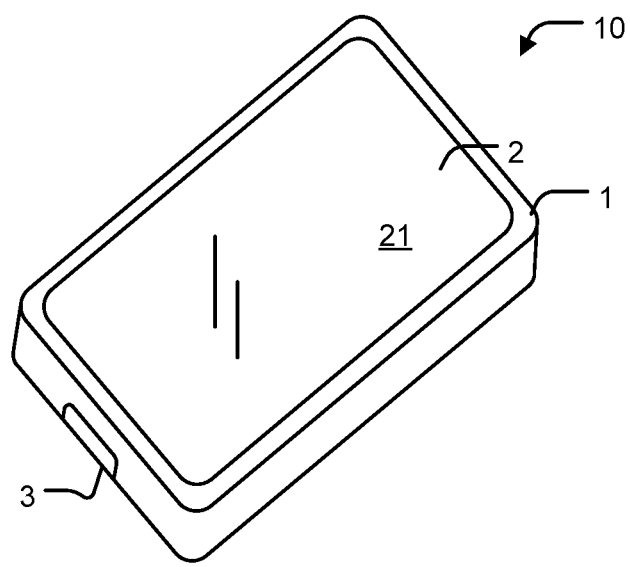
FIG. 1 is a perspective view of a first face of an assembled housing, according to an embodiment of the invention.
Figure 2:
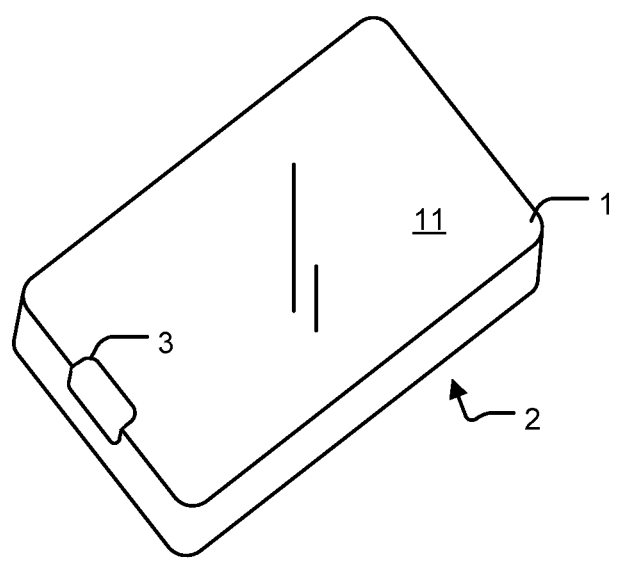
FIG. 2 is a perspective view of a second face of the assembled housing of FIG. 1.

Turning to FIGS. 1 and 2, a perspective view of a first face of an assembled device housing 10 is illustrated, according to an embodiment of the invention. The device housing 10 includes a first portion 2 defining a first plane of an outer surface 21 thereof. The first portion 2 may include a display panel or other electronic component or components. The housing 10 further includes a second housing portion 1 configured to engage and support the first housing portion 2 via hidden fasteners obscured through a cosmetic cap 3. The cosmetic cap 3 may be substantially radio transparent, for example, being formed of plastic or another suitable material. As shown in FIG. 2, the second housing portion 1 defines a second plane of an outer surface 11 thereof. According to at least one embodiment, the second housing portion 1 is formed of aluminum, an aluminum alloy, or stainless steel. According to at least one embodiment, the second housing portion 1 is milled from a single block of material, the material being at least one of aluminum, an aluminum alloy, or stainless steel.

Figure 3:
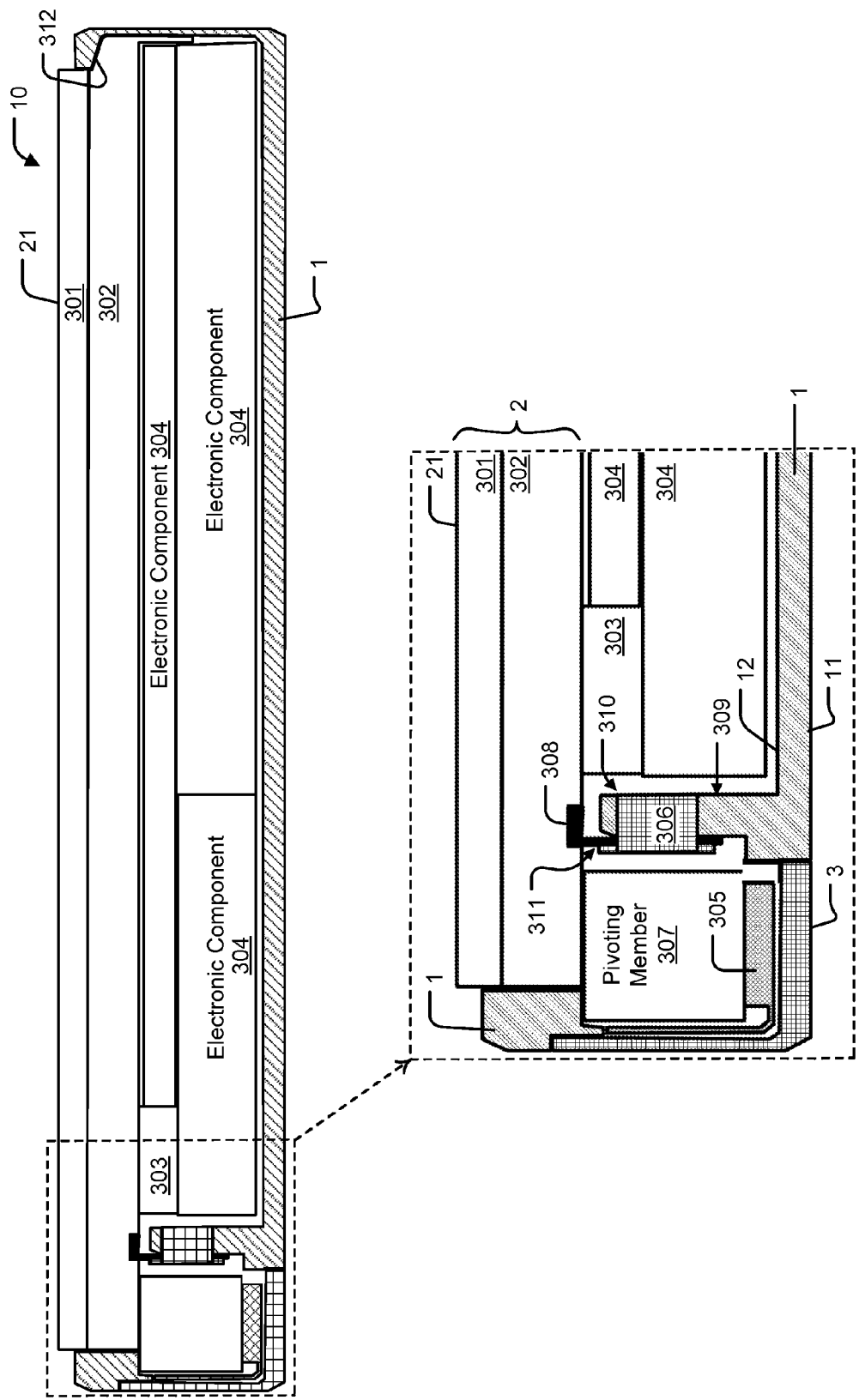
FIG. 3 is a cut-away view of the assembled housing of FIG. 1.

As described above, the housing portions 1 and 2 may be engaged and supported with hidden fasteners. Turning to FIG. 3, a cut-away view of the assembled housing 10 is illustrated which more clearly depicts these features.

As shown in FIG. 3, the first housing portion 2 may include a display panel 301 arranged on a supportive panel 302. The supportive panel 302 may be arranged to engage an inner lip or protrusion 312 of the second housing portion 1. Furthermore, the supportive panel 302 may include a support member 308 arranged thereon, at a first angle and/or substantially orthogonal to the outer surface 21 of the panel 301. The support member 308 may include at least one through-hole 311 formed there-through, configured to engage a fastener 306.

As further shown in FIG. 3, the second housing portion 1 may include a second support member 309 formed at a second angle and/or substantially orthogonal to an inner surface 12 thereof. The second support member 309 may include at least one retaining or threaded hole 310 configured to engage and retain the fastener 306. According to one embodiment, both the through hole 311 and retaining hole 310 are threaded. According to another embodiment of the invention, only the retaining hole 310 is threaded. According to other embodiments of the invention, fastener 306 is a self-tapping fastener and/or both of holes 310 and 311 lack threads. Both of holes 301 and 311 may be formed at any desirable angle to associated support members 308 and 309, including substantially orthogonal or further angled.

As further shown in FIG. 3, a pivoting member 307 is pivotally attached to the second housing portion 1. Furthermore, the pivoting member 307 may support an electronic component 305 on at least one surface thereof, and present the same substantially proximate the cosmetic cap 3. Moreover, the pivoting member 307 may support an electronic component 305 on at least two surfaces thereof, and present the same substantially proximate the cosmetic cap 3. Therefore, if wireless communication capabilities are desirable, component 305 may be configured as an antenna utilizing the substantial radio transparency of the cosmetic cap 3.

As further illustrated in FIG. 3, a plurality of electronic components 303 and 304 may be arranged and populated in the second housing portion 1. The plurality of electronic components 303 and 304 may be any suitable electronic components, including components for a personal electronic device comprising a rechargeable power source (e.g., battery or batteries), logic boards, computer processors, display components, electronic interconnects, radio/communications interfaces, and/or other suitable components. The plurality of electronic components 303 and 304 may be substantially supported within the housing 10 upon final assembly through the use of one or more fasteners 306 and the engaging of the edge 312. The pivoting member 307 may allow relatively easy access to the fastener(s) 306 while obscuring the same, which is further obscured by the cosmetic cap 3. Furthermore, even if cosmetic cap 3 is damaged, the pivoting member 307 substantially obscures the fasteners 306 such that the housing 10 may remain intact.

Hereinafter, a more detailed description of the first and second housing portions and associated support members is provided with reference to FIGS. 4-6.

Figure 4:
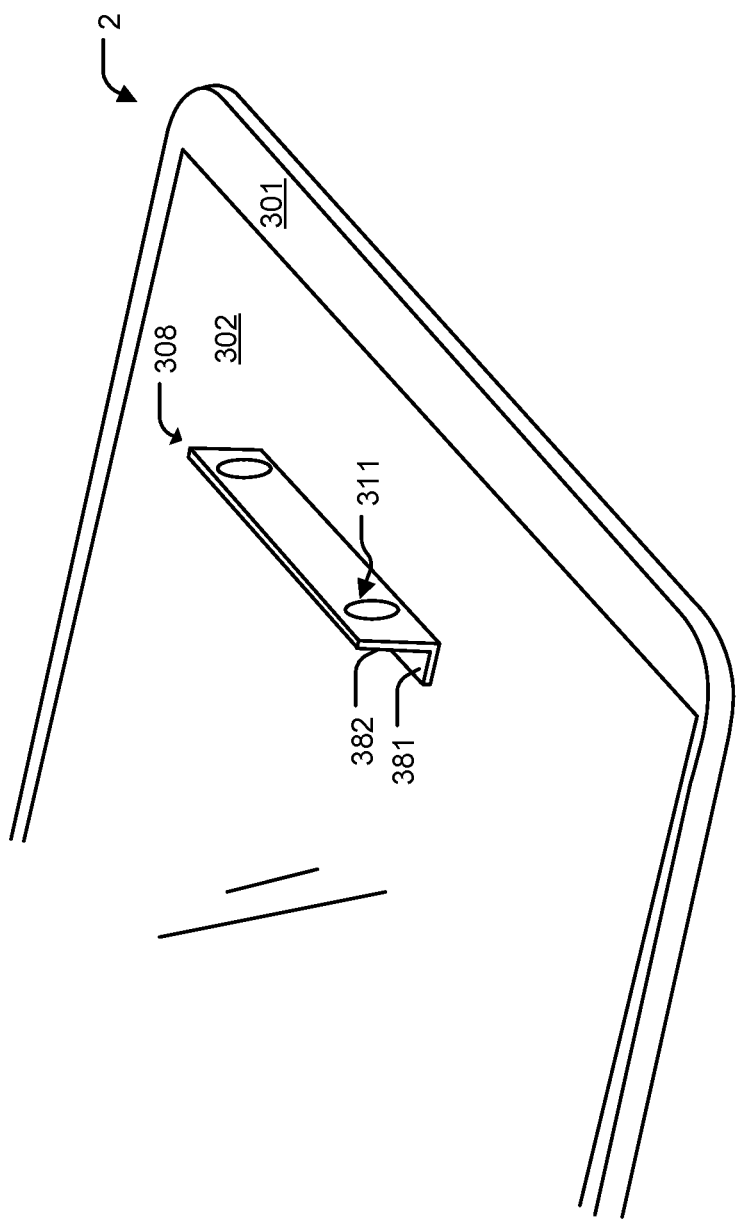
FIG. 4 is a perspective view of an inner portion of a first portion of a housing, according to an embodiment of the invention.

FIG. 4 is a perspective view of an inner portion of the first portion 2 of housing 10, according to an embodiment of the invention. As illustrated, the support member 308 may include a first member 381 attached to the supportive panel 302 via a weld or coalescing of material. Alternatively, support member 308 may be formed directly from the supportive panel 308. The support member 308 further includes a second member 382 arranged at an angle to the first member 381. According to one embodiment, the second member 382 is substantially orthogonal to the first member 381. Therefore, the support member 308 may be termed an L-support or bracket integrally attached to the supportive panel 302.

Figure 5:
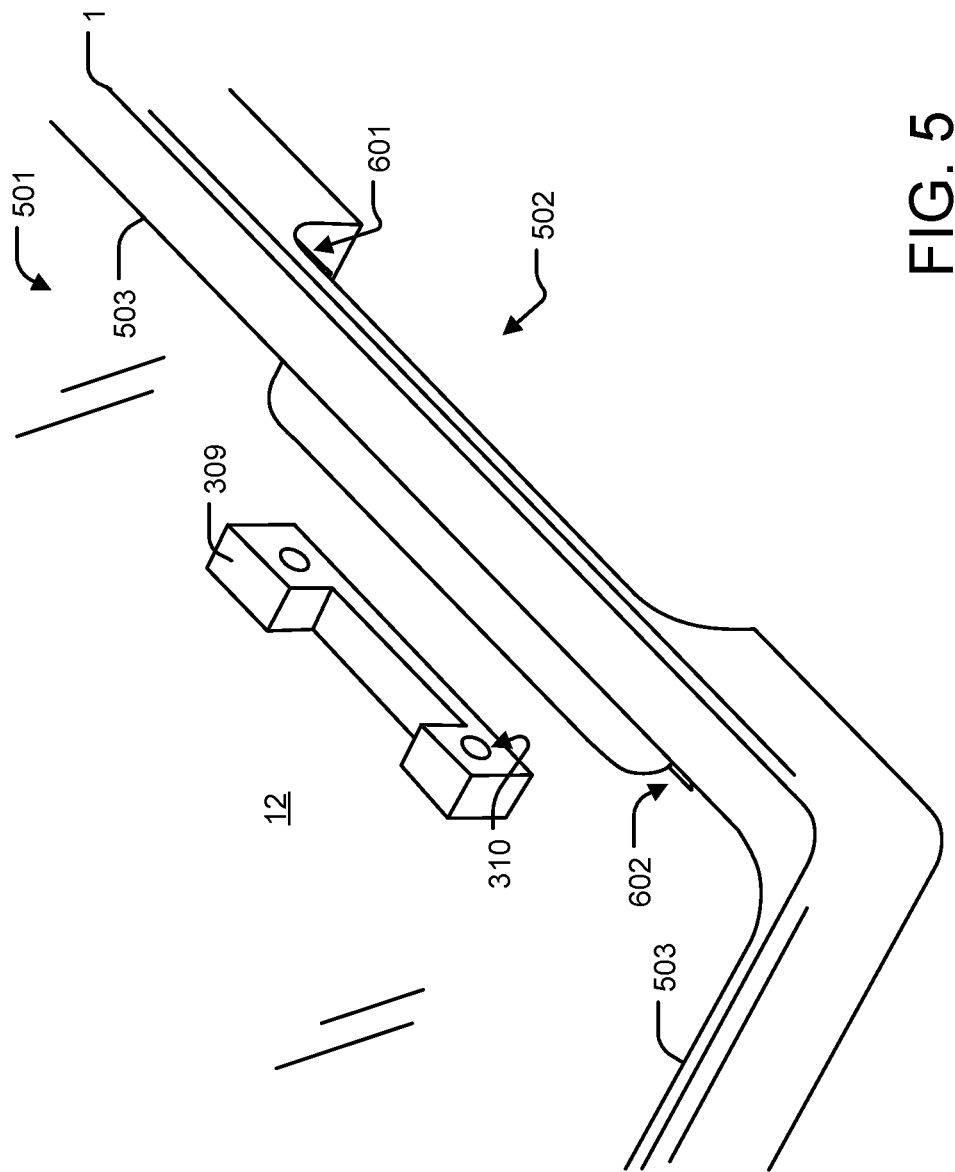
FIG. 5 is a perspective view of an inner portion of a second portion of a housing, according to an embodiment of the invention.

FIG. 5 is a perspective view of an inner portion of the second portion 1 of the housing 10, according to an embodiment of the invention. According to one embodiment, the support member 309 may be arranged at a second angle substantially orthogonal to inner surface 12 of the housing portion 1. The support member 309 may be formed from the housing portion 1, for example, as a milled support boss formed from a single block of material. As further shown, the outer edge 503 of the housing portion 1 defines an inner cavity 501 for populating with electronic components 303-304. Moreover, cutout 502 allows external access to the support boss 309, for example, for inserting and engaging fasteners. The same is illustrated more clearly in FIG. 6.

Figure 6:
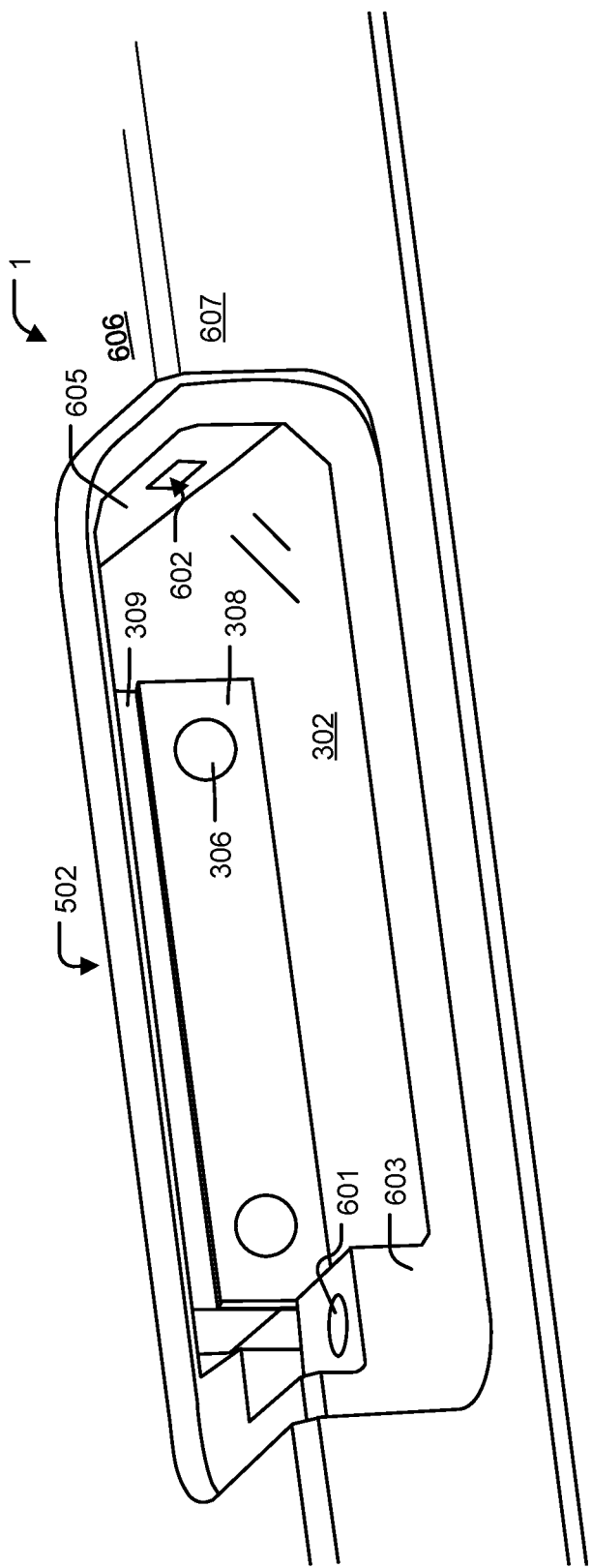
FIG. 6 is a perspective view of a cutout of the second portion of the housing of FIG. 1.

FIG. 6 is a perspective view of the cutout 502 of an assembled housing 10. As illustrated, the cutout 502 allows for access into the cavity 501 for inserting and engaging fasteners 306. The cutout 502 is a corner cutout, for example, extending across two major surfaces 607 and 606 of the second portion 1 of the housing 10. Furthermore, the second portion 1 of the housing 10 may include pivoting engagement recess or slot 602 formed on inner surface 605 therein proximate the cutout 502 for engaging and supporting pivoting member 307. The second portion 1 may further include a fastener retention feature or threaded hole 601 arranged therein substantially orthogonal to the support member 309 and proximate the cutout 502 for engaging and retaining a fastener for supporting the pivoting member 307. Moreover, a peripheral lip or edge 603 may be formed about edges of the cutout 502 for engaging and retaining the cosmetic cap 3, for example, through the use of snap-fit edges, pressure-sensitive-adhesive, and/or other forms of attaching. The resulting attachment of the cosmetic cap 3 may be relatively liquid-tight, and prevent ingress of foreign matter, liquid, and other material.

As further shown in FIG. 6, when assembled, the support members 308 and 309 align and engage such that fasteners 306 may be threaded and retained by the associated, aligned holes 310 and 311. Therefore, the housing 10 may benefit from the structural integrity of screw fasteners while the same may be obscured through the use of pivoting member 307. This is more clearly illustrated in FIG. 7.

Figure 7:
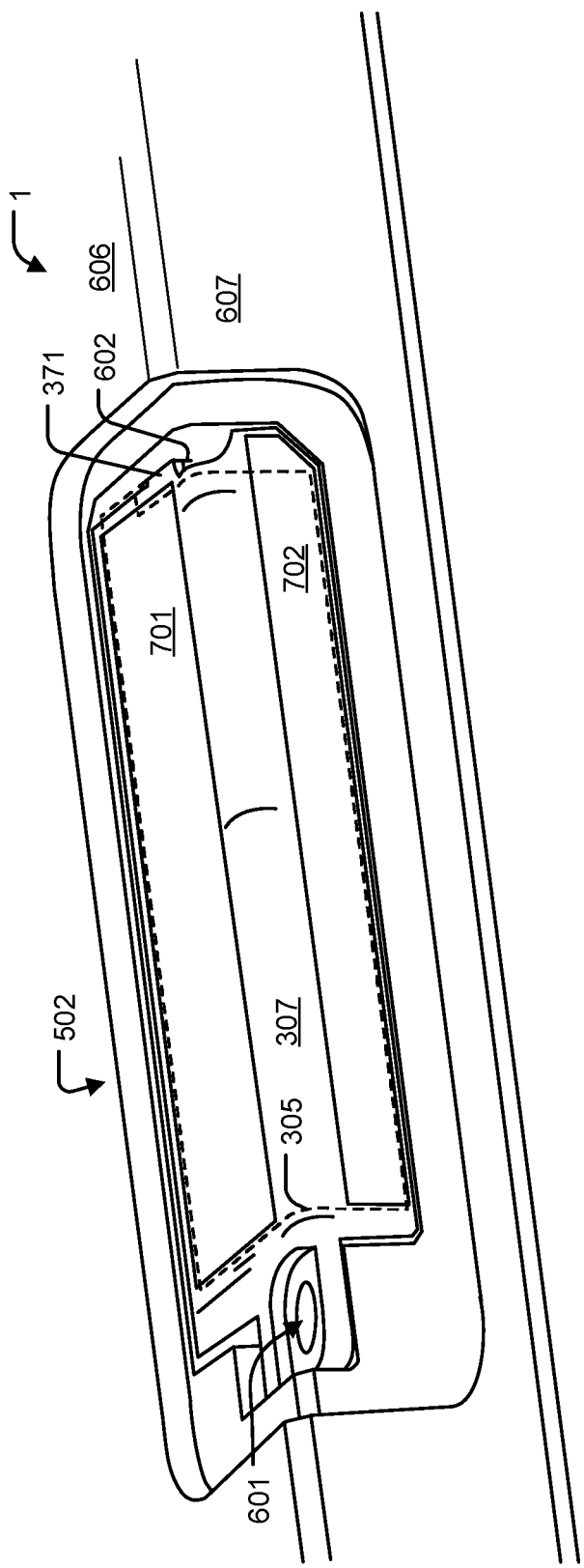
FIG. 7 is a perspective view of a pivoting member engaged with the second portion of the housing of FIG. 1.
Figure 9:
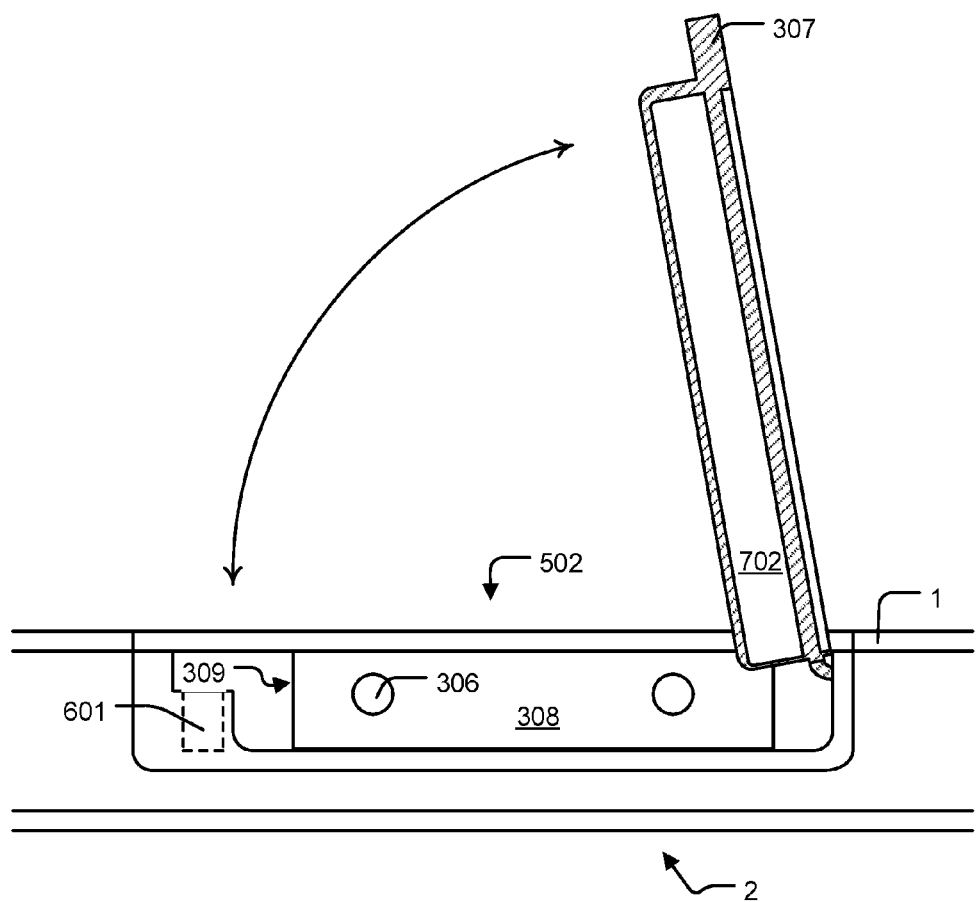
FIG. 9 is an elevation view of a pivoting member pivoting relative to the second portion of the housing of FIG. 1.

FIG. 7 is a perspective view of pivoting member 307 engaged with the second portion 1 of the housing 10. As shown, the pivoting member 307 is arranged to engage and pivot within and out of the cutout 502. The pivoting member 307 is thus configured to pivot between at least two positions. The first, closed position is illustrated in FIG. 7 and the second, open position is illustrated in FIG. 9.

As shown in FIG. 7, the pivoting member 307 is pivotally attached to the second portion 1 of the housing 10 through pivoting engagement recess 602 through pivoting engagement member 371. The pivoting engagement member 371 may be a serpentine or curved protrusion allowing for the pivoting between at least two positions described above. As further shown in FIG. 7, the electronic component 305 may be draped, folded, or supported on at least two surfaces 701 and 702 of the pivoting member 307. The same may be facilitated through use of adhesive tape, pressure-sensitive adhesive, or other attachments facilitating stable support of the component 305. Furthermore, at least a portion of the component 305 or an interconnect (e.g., electronic interconnect) thereof may be routed from one of the surfaces 701 and 702 into the inner cavity 501 of the assembled housing 10. This is more clearly illustrated in FIGS. 8A-8B.

Figure 8A:
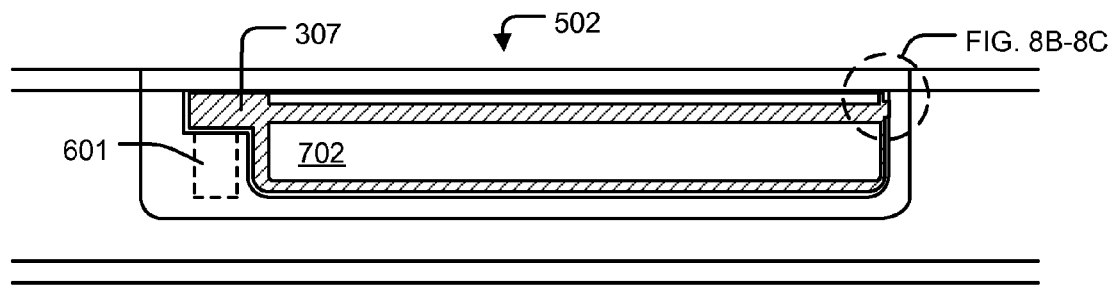
FIG. 8A is an elevation view of a pivoting member engaged with the second portion of the housing of FIG. 1.

FIG. 8A is an elevation view of pivoting member 307 engaged with the second portion 1 of the housing 10. As shown, the pivoting member 307 may be fastened within the cutout 502 through use of a fastener with hole 601.

Figure 8B:
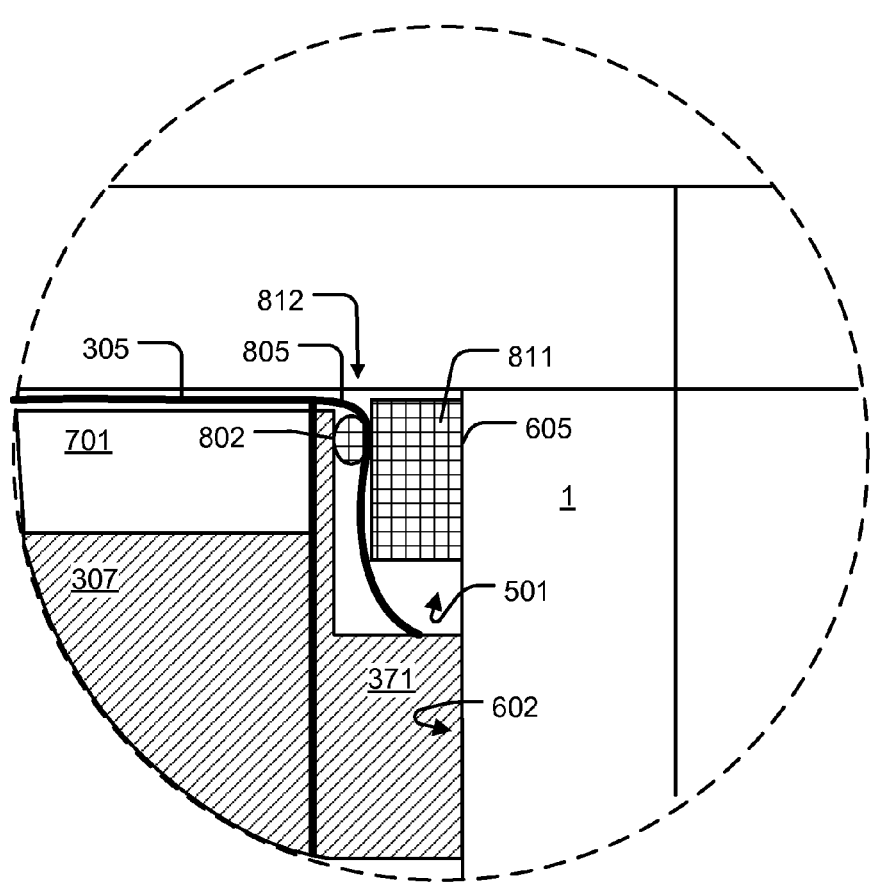
FIG. 8B is an expanded portion of FIG. 8A, depicting routing of electronic interconnects about a pivoting member, according to an embodiment of the invention.

FIG. 8B is an expanded portion of FIG. 8A, depicting routing of electronic interconnects about pivoting member 307, according to an embodiment of the invention. As shown, a portion or interconnect 805 of the component 305 may be routed within a gap 812 between the second portion 1 and the pivoting member 307 and behind the pivoting engagement member 371 into the inner cavity 501. The routing may be stabilized through use of a first compliance member 811 and an adhesive compliance member 802. The first compliance member 811 may be an elastomeric block, foam block, or other suitable member which may be further adhered to an inner surface 605 of the second portion 1 of the housing 10. The adhesive compliance member 802 may be a measurement of adhesive chemistry applied between the interconnect 805 and a surface of the pivoting member 307. The adhesive chemistry may be any suitable chemistry, including glue or softened plastic. The adhesive compliance member 802 may adhere to both the interconnect 805 and the pivoting member 307 such that the component 305 refrains from substantial buckling or puckering during assembly of the device housing 10. Both compliance members 802 and 811 may be partially or entirely omitted, or may be shaped/arranged differently, according to any desired implementation of embodiments described herein.

Although described as a single component, the component 305 and interconnect 805 may be formed integrally, for example, as a flexible component and interconnect such as an antenna member. The component 305 and interconnect 805 may therefore include one or more antennas interconnected with one or more interfaces of electronic components 303-304 within cavity 501 of the assembled device 10. The same may be pivoted along with pivoting member 307 as illustrated in FIG. 9. In this manner, fasteners 306 may be obscured after assembly and re-work/repair of an assembled device 10.

Figure 8C:
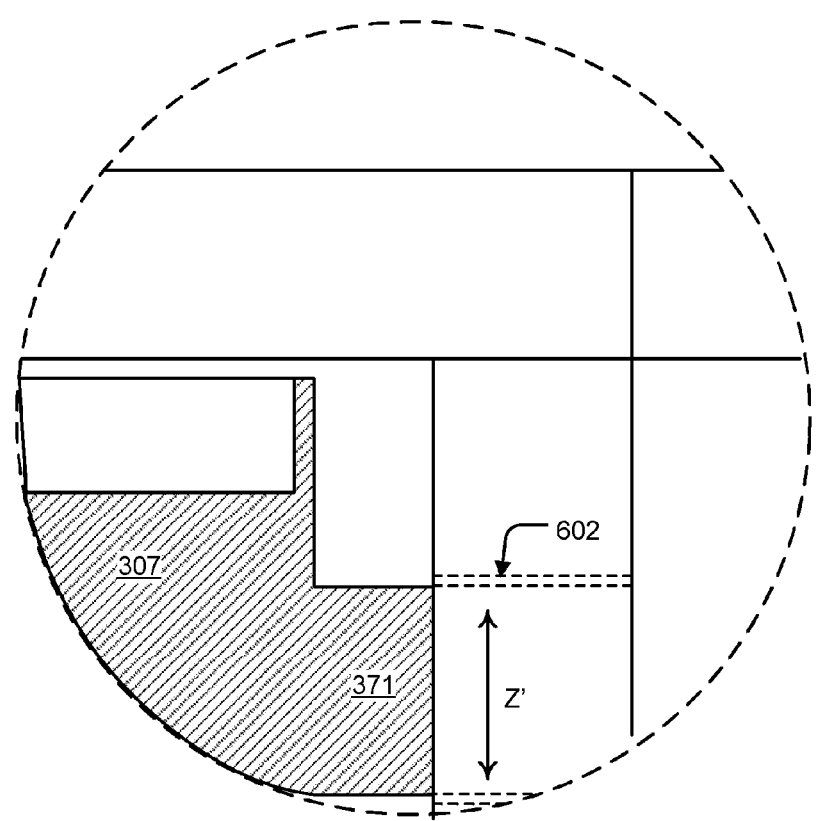
FIG. 8C is an expanded portion of FIG. 8A, depicting a nested protrusion of a pivoting member, according to an embodiment of the invention.

FIG. 8C is an expanded portion of FIG. 8A, depicting a nested protrusion 371 of pivoting member 307, according to an embodiment of the invention. As shown, the pivoting engagement member or protrusion 371 may engage with the associated pivoting engagement recess or slot 602 such that robust engagement is facilitated with limited and/or restricted deflection/motion along the Z' axis.

Hereinafter, methods of assembling electronic devices according to the teachings provided above are described in detail with reference to FIG. 10.

Figure 10:
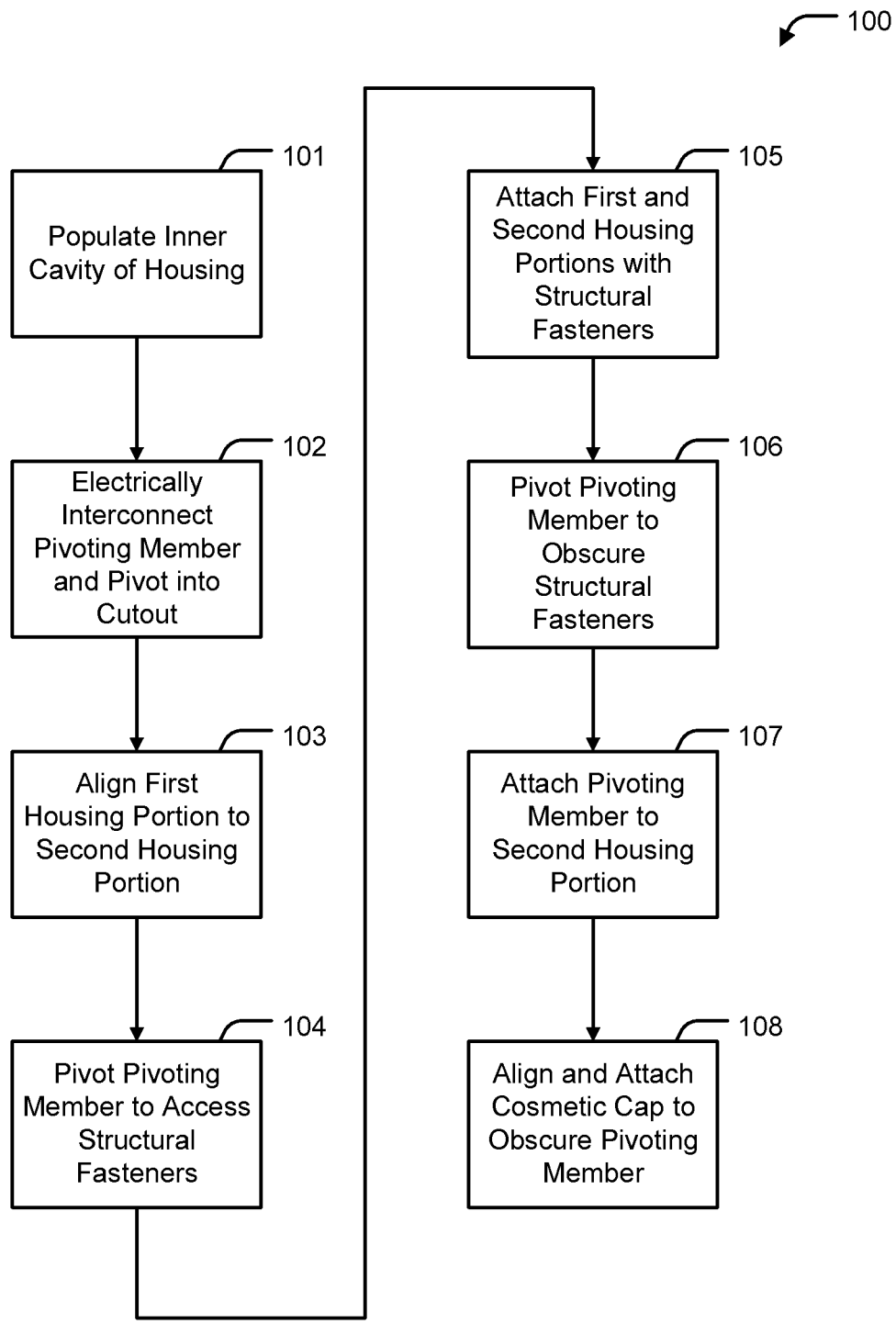
FIG. 10 is a flowchart of a method of assembling a personal electronic device, according to an embodiment of the invention.

FIG. 10 is a flowchart of a method 100 of assembling a personal electronic device, according to an embodiment of the invention. The method 100 includes populating an inner cavity of a device housing at block 101. For example, the inner cavity may be substantially similar to inner cavity 501 of FIG. 5, and may be populated with electronic components 303-304 as illustrated in FIG. 3.

Thereafter, the method 100 includes electrically interconnecting a component supported by a pivoting member to at least a portion of the populated electronic components, and pivoting the pivoting member into a device housing cutout, at block 102. For example, the interconnecting may include routing an interconnect 805 of a component 305 into the inner cavity 501. The pivoting may include pivoting the pivoting member from a second, open position as illustrated in FIG. 9 to a first, closed position as illustrated in FIG. 7.

Thereafter, the method 100 includes aligning a first housing portion to a second housing portion at block 103. The aligning may include engaging an edge of the first housing portion 2 to an inner edge 312 of the second housing portion 1, and pivoting the first housing portion down and against the second housing portion 1 such that support members 308 and 309 are aligned.

Thereafter, the method 100 includes pivoting the pivoting member to the second, open position to allow access to the aligned support members at block 104. The pivoting may include pivoting the pivoting member as illustrated in FIG. 9.

Thereafter, the method 100 includes attaching the first housing portion and the second housing portion to one another with structural fasteners at block 105. The attaching may include inserting, engaging, and retaining fasteners 306 with holes 310 and 311 of the aligned support members 308 and 309, for example, by threading and tightening the fasteners 306.

Thereafter, the method 100 includes pivoting the pivoting member 307 to obscure the fasteners at block 106. The pivoting may include pivoting the pivoting member 307 from the second, open position illustrated in FIG. 9 to the first, closed position illustrated in FIG. 7.

Thereafter, the method 100 includes attaching the pivoting member 307 to the second housing portion 1 at block 107. The attaching may include inserting, engaging, and retaining a fastener in fastener hole 601.

Thereafter, the method 100 includes aligning and attaching a cosmetic cap to obscure the attached pivoting member at block 108. The aligning and attaching may include aligning cosmetic cap 3 to cutout 502 and engaging the same with adhesive, for example, pressure-sensitive adhesive.

It is noted that additional steps than those particularly illustrated may be included within the scope of embodiments of the invention. Additional steps may include periodic device testing and additional pivoting, aligning, and fitting steps to ensure compliance. Further additional steps may include cosmetic inspection, cleaning, or otherwise increasing cosmetic appeal of an assembled device. Further additional steps may also be suitable, depending upon any desired implementation of embodiments of the invention.

It is further noted that steps particularly illustrated in FIG. 10 may sometimes be omitted, skipped, or performed in parallel, depending upon any desired implementation of embodiments of the invention.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line and/or assembly process, including automated assembly, conveyance, or testing. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A housing for an electronic device, comprising:
a first housing portion having a first support member with a surface defining a plane, the surface having a through hole for engaging a fastener;
a second housing portion having a second support member with a retaining hole configured to align with the through hole and for retaining the fastener; and
a pivoting member pivotally coupled to the second housing portion, the pivoting member configured to pivot in a direction parallel to the plane, the pivoting member configured to pivot between a first position that obscures the through hole and a second position that allows access to the through hole, wherein an antenna component is coupled to the pivoting member such that the antenna component pivots with the pivoting member.

2. The housing of claim 1, further comprising:
a cap positioned over the antenna component and comprised of a radio frequency transparent material allowing radio communication to and/or from the antenna component to pass therethrough.

3. The housing of claim 1, wherein the antenna component is coupled to a first antenna surface and a second antenna surface of the pivoting member, the first antenna surface having a non-parallel orientation with respect to the second antenna surface.

4. The housing of claim 1, wherein a portion of the antenna component is positioned within a gap between the pivoting member and the second housing portion.

5. The housing of claim 4, wherein the portion of the antenna component is partially secured within the gap with a compliance member secured to the second housing portion and positioned within the gap.

6. The housing of claim 5, wherein the portion of the antenna component is positioned between the compliance member and an adhesive compliance member within the gap.

7. The housing of claim 1, wherein the pivoting member is arranged to pivot within a cutout along an edge of the second housing portion.

8. The housing of claim 7, wherein the cutout includes a peripheral edge configured to retain a cosmetic cap configured to obscure the pivoting member in the first position.

9. The housing of claim 8, wherein the cosmetic cap is formed of a substantially radio transparent material.

10. The housing of claim 1, wherein the pivoting member has a first end proximate to a pivot axis of the pivoting member, wherein a second end of the pivoting member is configured to be fastened to the second housing portion when the pivoting member is in the first position.

11. An electronic device, comprising:
a housing having a cutout positioned along an edge of the housing, the cutout providing access to an opening for a fastener configured to couple a first housing portion with a second housing portion, the opening positioned on a surface oriented in accordance with a plane;

a pivoting member pivotally attached to the second housing portion, the pivoting member configured to pivot in a direction parallel to the plane, the pivoting member configured to pivot between a first position obscuring the opening and a second position allowing access to the opening; and an antenna component coupled to the pivoting member such that the antenna component pivots with the pivoting member between the first position and the second position.

12. The electronic device of claim 11, further comprising:
a cap positioned over the antenna component and comprised of a radio frequency transparent material allowing radio communication to and/or from the antenna component to pass therethrough.

13. The electronic device of claim 11, wherein a portion of the antenna component is routed within a gap between the pivoting member and the second housing portion.

14. The electronic device of claim 13, wherein the portion of the antenna component is positioned between a compliance member and an adhesive within the gap.

15. The electronic device of claim 13, wherein the gap provides access to an inner cavity of the housing.

16. The electronic device of claim 15, wherein the antenna component is electrically connected via the gap to a component within the inner cavity of the housing.

17. The electronic device of claim 11, wherein the pivoting member is pivotally attached to the second housing portion by a pivoting engagement member positioned within a pivoting engagement recess of the second housing portion.

18. The electronic device of claim 11, wherein the pivoting member comprises at least two surfaces, wherein the antenna component is coupled with the at least two surfaces.

19. The electronic device of claim 11, further comprising:
an electronic components disposed in an inner cavity of the housing, wherein the antenna component is in operative communication with the electronic component.

20. The electronic device of claim 19, wherein an interconnect portion of the antenna component is routed between the pivoting member and the second housing portion.

21. A method of assembling a housing of an electronic device, the housing comprising a first housing portion and a second housing portion, the second housing portion having a cutout positioned along an edge of the second housing portion, the cutout providing access to a fastener configured to couple the first housing portion with the second housing portion, the housing including a pivoting member pivotally attached to the second housing portion and configured to pivot between a first position hiding the fastener and a second position providing access to the fastener, the method comprising:

populating an inner cavity of the housing with electronic components;

electrically interconnecting an antenna component supported by the pivoting member to at least a portion of the electronic components;

positioning the first housing portion with respect to the second housing portion such that a first opening of the first housing portion is aligned with a second opening of the second housing portion, the first opening positioned on a surface of the first housing portion oriented in accordance with a plane;

pivoting the pivoting member in a direction parallel to the plane to the second position with the antenna component coupled thereto allowing access to the aligned first opening and second opening;

attaching the first housing portion to the second housing portion by positioning the fastener through the aligned first opening and second opening; and pivoting the pivoting member to the first position obscuring the fastener.

22. The method of claim 21, further comprising:
attaching a cosmetic cap to the second housing portion so as to obscure the pivoting member.

* * * * *